(12) United States Patent
Xu

(10) Patent No.: US 11,382,452 B1
(45) Date of Patent: Jul. 12, 2022

(54) SUPPORT BRACKET FOR OUTDOOR CAMPFIRE BARBECUE DEVICE AND OUTDOOR CAMPFIRE BARBECUE DEVICE

(71) Applicant: Juan Xu, Hunan (CN)

(72) Inventor: Juan Xu, Hunan (CN)

( * ) Notice: Subject to any disclaimer, the term of this patent is extended or adjusted under 35 U.S.C. 154(b) by 0 days.

(21) Appl. No.: 17/557,022

(22) Filed: Dec. 20, 2021

(30) Foreign Application Priority Data

Sep. 13, 2021 (CN) .......................... 202111068728.4

(51) Int. Cl.
*A47J 33/00* (2006.01)
*F24C 1/16* (2021.01)

(52) U.S. Cl.
CPC ................. *A47J 33/00* (2013.01); *F24C 1/16* (2013.01)

(58) Field of Classification Search
CPC ................. A47J 33/00; F24B 3/00; F24C 1/16
See application file for complete search history.

(56) References Cited

U.S. PATENT DOCUMENTS

| | | | | |
|---|---|---|---|---|
| 1,412,377 | A * | 4/1922 | Suffa .................. | A47J 33/00 248/168 |
| 1,617,806 | A * | 2/1927 | Hanson ................. | F24C 1/16 126/30 |
| 6,679,245 | B1 | 1/2004 | Lu | |
| 6,725,873 | B2 * | 4/2004 | Liu .................. | E04H 15/50 135/159 |
| 10,151,490 | B1 | 12/2018 | Wolf | |
| 2010/0319743 | A1 * | 12/2010 | Zhou .................. | E04H 15/28 135/135 |
| 2011/0024597 | A1 * | 2/2011 | Tan .................. | F16M 11/245 248/440.1 |

FOREIGN PATENT DOCUMENTS

| | | |
|---|---|---|
| CN | 204970942 U | 1/2016 |
| CN | 211242188 U | 8/2020 |
| TW | M351053 U | 2/2009 |

* cited by examiner

*Primary Examiner* — Alfred Basichas

(57) ABSTRACT

A support bracket includes at least three supporting rods, a middle rod, at least three first connecting rods and at least three second connecting rods. For each supporting rod, one end of it is configured to be supported on a supporting surface, the other end of it is configured to support a campfire assembly. One end of the middle rod is provided with a first pivot, and the other end of the middle rod is provided with a second pivot. For each first connecting rods, one end of it is pivotably connected to corresponding one of the at least three supporting rods, the other end of it is pivotably connected to the first pivot. For each second connecting rods, one end of it is pivotably connected to corresponding one of the at least three supporting rods, the other end of it is pivotably connected to the second pivot.

10 Claims, 6 Drawing Sheets

SUPPORT BRACKET FOR OUTDOOR CAMPFIRE BARBECUE DEVICE AND OUTDOOR CAMPFIRE BARBECUE DEVICE

CROSS-REFERENCE TO RELATED APPLICATIONS

This application claims priority to Chinese patent application CN202111068728.4, filed on Sep. 13, 2021, which is incorporated herein by reference in its entirety.

FIELD

The subject matter herein generally relates to barbecue devices, and particularly relates to a support bracket for an outdoor campfire barbecue device and an outdoor campfire barbecue device.

BACKGROUND

With development of social economy, people pay more and more attention to improvement of life quality in addition to their busy work and life. Tourism, camping and other activities close to nature are also more and more popular. Among them, outdoor campfire barbecue can not only get close to nature and create an atmosphere, but also warm up, provide lighting and enjoy delicious food, which has become a favorite way for people to relax.

In outdoor campfire barbecue, a campfire barbecue grill is essential. There are many kinds of campfire barbecue grills, but most of them have various problems. There is an integrated campfire barbecue grill, which is large and difficult to carry. There are some demountable campfire barbecue grills, which are difficult to assemble and seriously affect user's experience. There are also some foldable campfire grills whose structure is not stable. On the one hand, it will affect stability of campfire, but also indirectly affect quality of the barbecue. The collapse of the campfire will also bring users risk of scald and fire.

Therefore, the present disclosure provides an outdoor campfire barbecue device, which is convenient for carrying, easy to assemble, stable in structure, and can effectively solve above problems.

SUMMARY

In order to solve above problems, the present disclosure provides an outdoor campfire barbecue device, which is convenient for carrying, easy to assemble, stable in structure.

A support bracket includes at least three supporting rods, a middle rod, at least three first connecting rods and at least three second connecting rods. For each supporting rod, one end of it is configured to be supported on a supporting surface, the other end of it is configured to support a campfire assembly. One end of the middle rod is provided with a first pivot, and the other end of the middle rod is provided with a second pivot. For each first connecting rods, one end of it is pivotably connected to corresponding one of the at least three supporting rods, the other end of it is pivotably connected to the first pivot. For each second connecting rods, one end of it is pivotably connected to corresponding one of the at least three supporting rods, the other end of it is pivotably connected to the second pivot.

In at least one embodiment, each of the first connecting rods is pivotably connected to a middle part of the corresponding one of the supporting rods, and each of the second connecting rods is pivotably connected to a lower part of the corresponding one of the supporting rods.

In at least one embodiment, the middle rod is configured to be capable of moving in an axial direction between an unfold state where the at least three first connecting rods are in a same plane perpendicular to the axial direction and a fold state where the supporting rods are close to the middle rod.

An outdoor campfire barbecue device, includes a campfire assembly configured to support fuel; at least three supporting rods, a middle rod, at least three first connecting rods and at least three second connecting rods. For each supporting rod, one end of it is configured to be supported on a supporting surface, the other end of it is configured to support the campfire assembly. One end of the middle rod is provided with a first pivot, and the other end of the middle rod is provided with a second pivot. For each first connecting rods, one end of it is pivotably connected to corresponding one of the at least three supporting rods, the other end of it is pivotably connected to the first pivot. For each second connecting rods, one end of it is pivotably connected to corresponding one of the at least three supporting rods, the other end of it is pivotably connected to the second pivot.

In at least one embodiment, each of the first connecting rods is pivotably connected to a middle part of the corresponding one of the supporting rods, and each of the second connecting rods is pivotably connected to a lower part of the corresponding one of the supporting rods.

In at least one embodiment, the middle rod is configured to be capable of moving in an axial direction between an unfold state where the at least three first connecting rods are in a same plane perpendicular to the axial direction and a fold state where the supporting rods are close to the middle rod.

In at least one embodiment, the campfire assembly includes surrounding boards, each supporting rod defines two slots, two opposite ends of each surrounding board are engaged in one of the two slots of two adjacent supporting rods to form an accommodating space.

In at least one embodiment, the campfire assembly further includes a first supporting net configured to support the fuel arranged in the accommodating space.

In at least one embodiment, a lower part of the surrounding boards is provided with a supporting element extending towards the accommodating space, the first supporting net is connected to the supporting element.

In at least one embodiment, the campfire assembly further includes a second supporting net arranged in the accommodating space and arranged on the first supporting net.

In at least one embodiment, sizes of apertures of the second supporting net are less than those of the first supporting net.

In at least one embodiment, the second supporting net is detachably supported on the first supporting net.

In at least one embodiment, the first supporting net and the second supporting net are made of fire-proof materials.

In at least one embodiment, the outdoor campfire barbecue device further includes a dust net configured to collect debris including falling fuel or fuel fire or barbecue stains.

In at least one embodiment, the dust net is provided with hooks at corners, a middle part of each supporting rod is provided with a mounting hole, each hook is configured to be engaged in the mounting hole.

In at least one embodiment, the dust net is made of fire-waterproof materials.

In at least one embodiment, the outdoor campfire barbecue device further includes end caps, each supporting rod defines an opening at a top thereof, each end cap is configured to be engaged in the mounting hole.

In at least one embodiment, the outdoor campfire barbecue device further includes a barbecue piece configured to support foods, two ends of the barbecue piece are capable of being supported on the surrounding boards.

Through the support bracket provided by the present disclosure, the first connecting rods and the second connecting rods make the supporting rods more stable, prevents the supporting rods from shifting so as to ensure stability of the support bracket. The middle rod connects the first connecting rods and the second connecting rod, which further ensures connection stability of the first connecting rods and the second connecting rods and improves stability of the support bracket. Moreover, both ends of the middle rods are hinged to the first connecting rods and the second connecting rods respectively, and the first connecting rods and the second connecting rods are hinged to corresponding supporting rods respectively, which allow users to fold or unfold the support bracket, thus effectively improving portability of the support bracket, reducing a size of the support bracket and effectively improving user's use experience. When in use, the middle rod can move downward along an axial direction until all the first connecting rods are in the same plane. At this time, the support bracket is in a first state—unfold state, and a campfire assembly can be positioned on a top of the support bracket. When users want to put the support bracket away, the middle rod can move upward along the axial direction until the support rods are close to the middle rod, at this time, the support bracket is in a second state—fold state.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION

Figure 1:
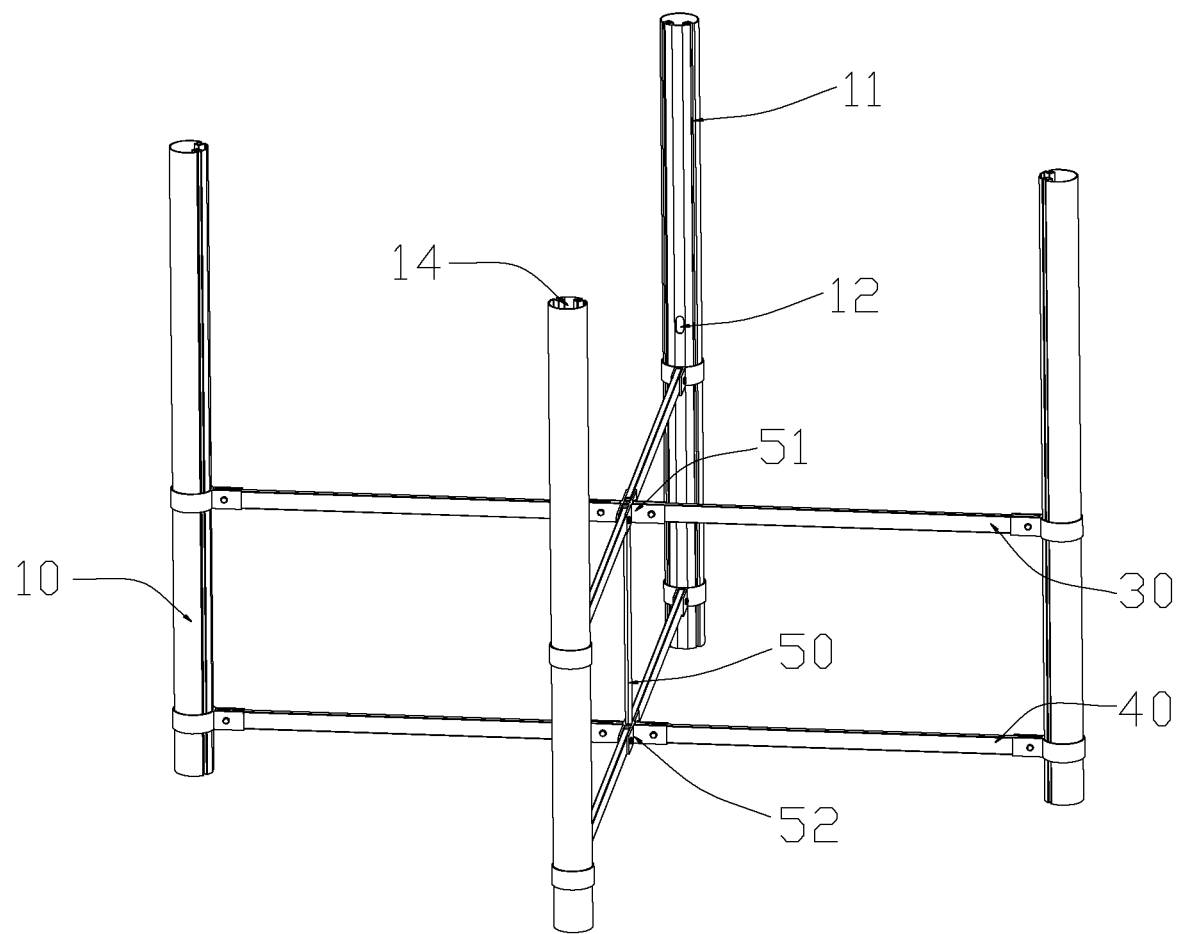
FIG. 1 is a schematic view of a support bracket in a first state according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Figure 2:
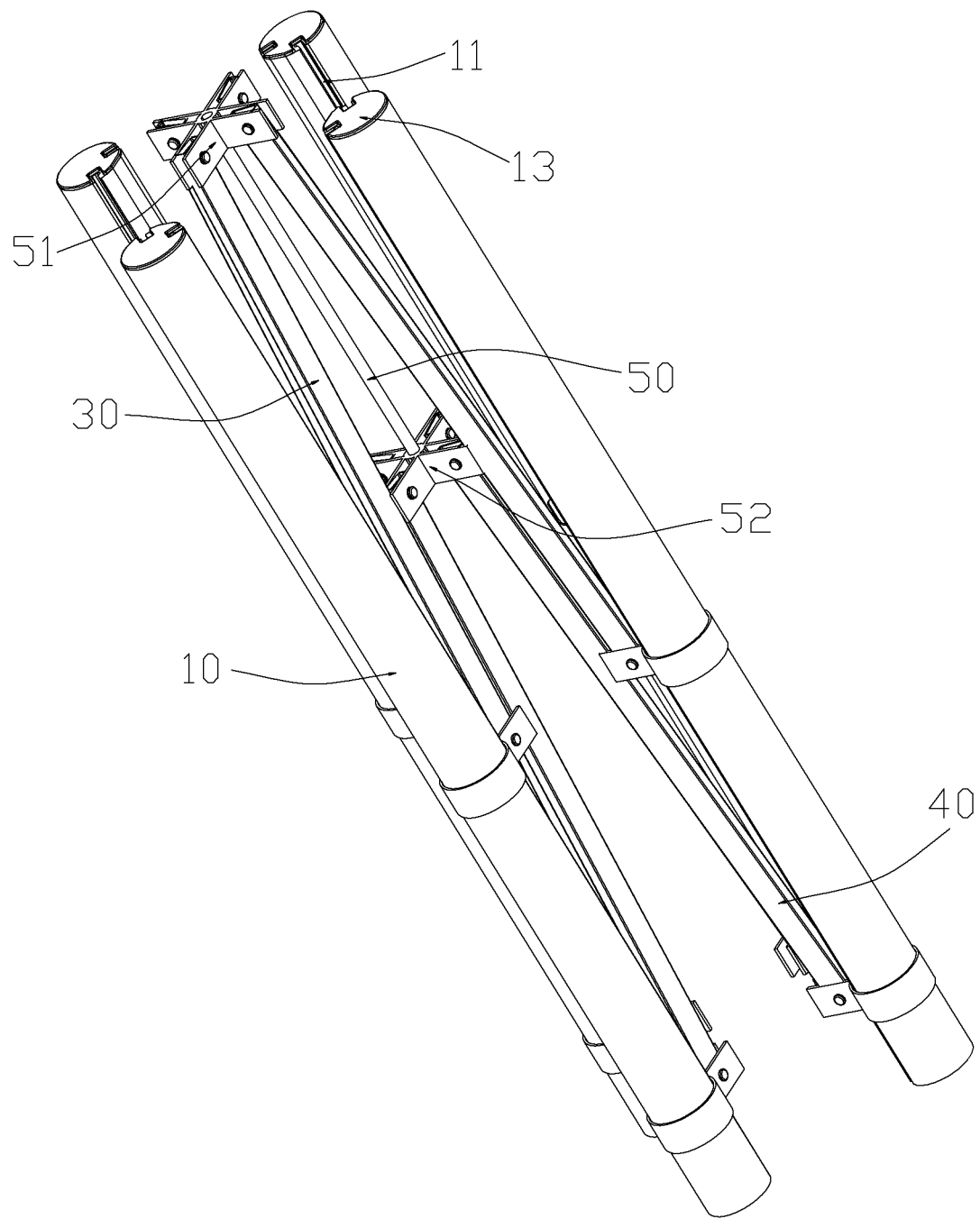
FIG. 2 is a schematic view of the support bracket in a second state according to an embodiment of the present disclosure.

Referring to FIGS. 1-2, a support bracket provided by an embodiment of the present disclosure, includes at least three supporting rods 10, a middle rod 50, at least three first connecting rods 30, and at least three second connecting rods 40. For each of the at least three supporting rods 10, One end of it is supported on a supporting surface, the other end of it is configured to support a campfire assembly 20. One end of the middle rod 50 is provided with a first pivot 51, and the other end of the middle rod 50 is provided with a second pivot 52. For each of the at least three supporting rods 30, one end of it is pivotably connected to one of the at least three rods 10, the other end of it is pivotably connected to the first pivot 51. For each of the at least three supporting rods 40, one end of it is pivotably connected to one of the at least three rods 10, the other end of it is pivotably connected to the second pivot 52.

Through above arrangements, the first connecting rods 30 and the second connecting rods 40 make the supporting rods 10 more stable, prevents the supporting rods 10 from shifting so as to ensure stability of the support bracket. The middle rod 50 connects the first connecting rods 30 and the second connecting rod 40, which further ensures connection stability of the first connecting rods 30 and the second connecting rods 40 and improves stability of the support bracket. Moreover, both ends of the middle rods 50 are hinged to the first connecting rods 30 and the second connecting rods 40 respectively, and the first connecting rods and the second connecting rods are hinged to corresponding supporting rods 10 respectively, which allow users to fold or unfold the support bracket, thus effectively improving portability of the support bracket, reducing a size of the support bracket and effectively improving user's use experience. When in use, the middle rod 50 can move downward along an axial direction until all the first connecting rods 30 are in the same plane. At this time, the support bracket is in a first state—unfolded state, and a campfire assembly can be positioned on a top of the support bracket. When users want to put the support bracket away, the middle rod 50 can move upward along the axial direction until the support rods 10 are close to the middle rod 50, at this time, the support bracket is in a second state—fold state.

In at least one embodiment, one end of each first connecting rod 30 is hinged at a middle part of corresponding supporting rod 10, and one end of each second connecting rod 40 is hinged at a lower part of corresponding supporting rod 10. Through such arrangements, each first connecting rod 30 and each second connecting rod 40 are hinged to the middle part and the lower part of corresponding supporting rod 10 respectively, which ensure the middle part and the lower part of the supporting rods more stable while space surrounded by upper parts of the supporting rods 10 is larger enough to support the campfire assembly. In addition, a center of gravity of the support bracket is lower, which further improves the stability of the support bracket. That is, such arrangements not only help the campfire assembly to accommodate more fuel to improve continuous combustion time of campfire, but also lower the center of gravity of the support bracket to ensure stability of the support bracket. It can greatly reduce risks due to dumping of the campfire assembly, thus ensuring user's safety.

Referring to FIGS. 3-6, an outdoor campfire barbecue device provided by an embodiment of the present disclosure, includes: a campfire assembly 20 configured to accommodate fuel; at least three supporting rods 10, a middle rod 50, at least three first connecting rods 30, and at least three second connecting rods 40. For each of the at least three supporting rods 10, One end of it is supported on a supporting surface, the other end of it is configured to support the campfire assembly 20. One end of the middle rod 50 is provided with a first pivot 51, and the other end of the middle rod 50 is provided with a second pivot 52. For each of the at least three supporting rods 30, one end of it is pivotably connected to one of the at least three rods 10, the other end of it is pivotably connected to the first pivot 51. For each of the at least three supporting rods 40, one end of it is pivotably connected to one of the at least three rods 10, the other end of it is pivotably connected to the second pivot 52.

Through above arrangements, the first connecting rods 30 and the second connecting rods 40 make the supporting rods 10 more stable, prevents the supporting rods 10 from shifting so as to ensure stability of the support bracket. Upper parts of the supporting rods 10 can stably support the campfire assembly 20 for campfire. The middle rod 50 connects the first connecting rods 30 and the second connecting rod 40, which further ensures connection stability of the first connecting rods 30 and the second connecting rods 40 and improves stability of the support bracket. Moreover, both ends of the middle rods 50 are hinged to the first connecting rods 30 and the second connecting rods 40 respectively, and the first connecting rods and the second connecting rods are hinged to corresponding supporting rods 10 respectively, which allow users to fold or unfold the support bracket, thus effectively improving portability of the support bracket, reducing a size of the support bracket and effectively improving user's use experience. When in use, the middle rod 50 can move downward along an axial direction until all the first connecting rods 30 are in the same plane perpendicular to the axial direction. At this time, the support bracket is in a first state—unfold state, and a campfire assembly can be positioned on a top of the support bracket. When users want to put the support bracket away, the middle rod 50 can move upward along the axial direction until the support rods 10 are close to the middle rod 50, at this time, the support bracket is in a second state—fold state.

In at least one embodiment, the campfire assembly 20 includes at least three surrounding boards 21. The upper part of each supporting rod 10 defines two slots 11, two opposite ends of each surrounding boards 21 are configured to be engaged in one of the two slots 11 of two adjacent supporting rods 10 respectively. In this way, the at least three surrounding boards 21 together with the at least three supporting rods 10 define an accommodating space 60 configured to accommodate fuel. Through such arrangements, the surrounding boards 21 can be easily inserted into the slots 11 to achieve a detachable connection between the surrounding boards 21 and the supporting rods 10. Charcoal is accommodated in the accommodating space 60 surrounded by the surrounding boards 21, which is convenient for users to heat or barbecue. In addition, the detachable connection is convenient for storage, which greatly improves portability of the support bracket. When in use, two opposite ends of each surrounding board are engaged in the slots 11, which limits a distance between two adjacent supporting rods 10, thus making the upper part of the supporting rods stable and greatly improving stability of the support bracket. It is safer for campfire and improves user's experience.

Figure 4:
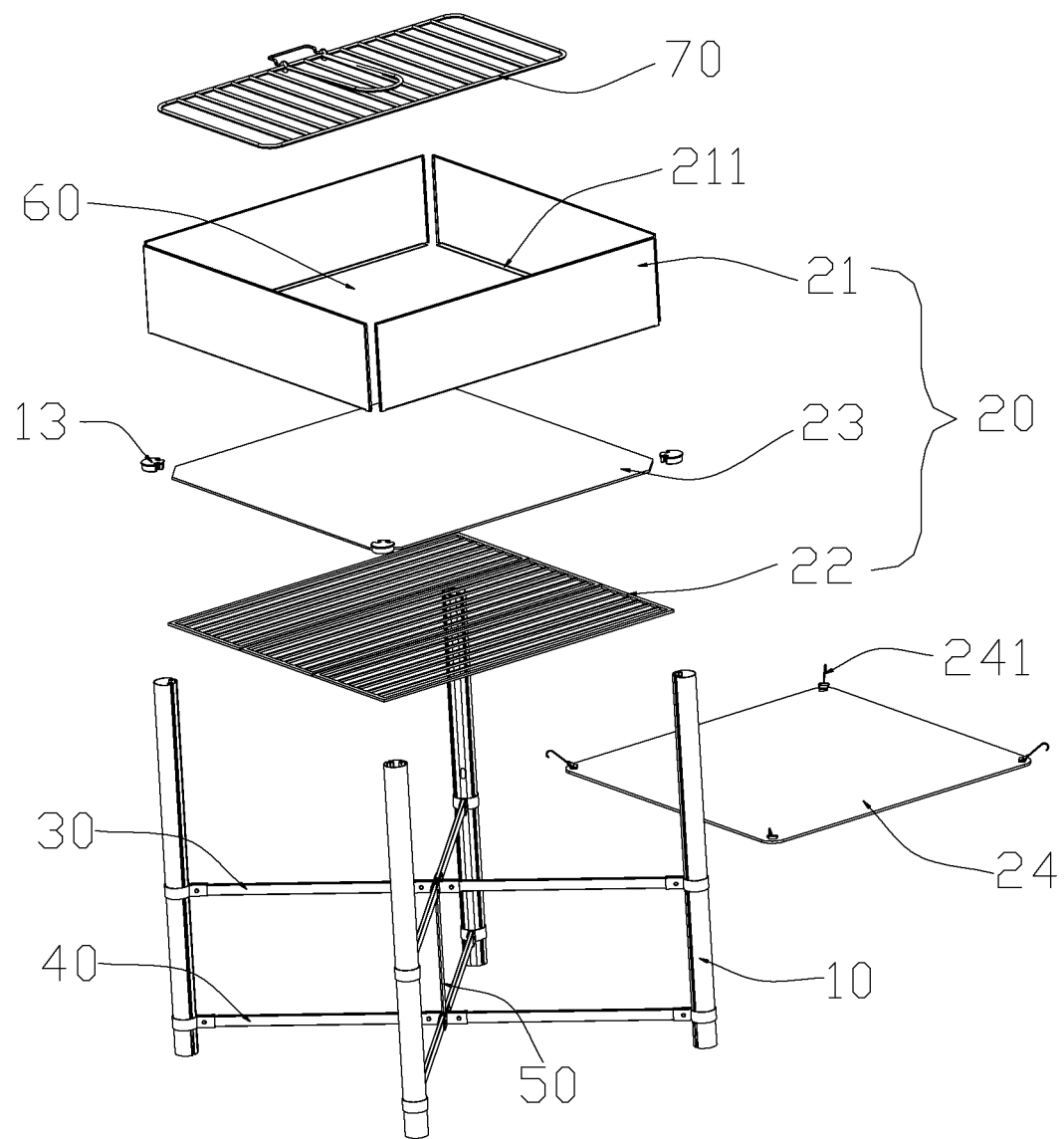
FIG. 4 is an exploded view of the outdoor campfire barbecue device of FIG. 3.
Figure 6:
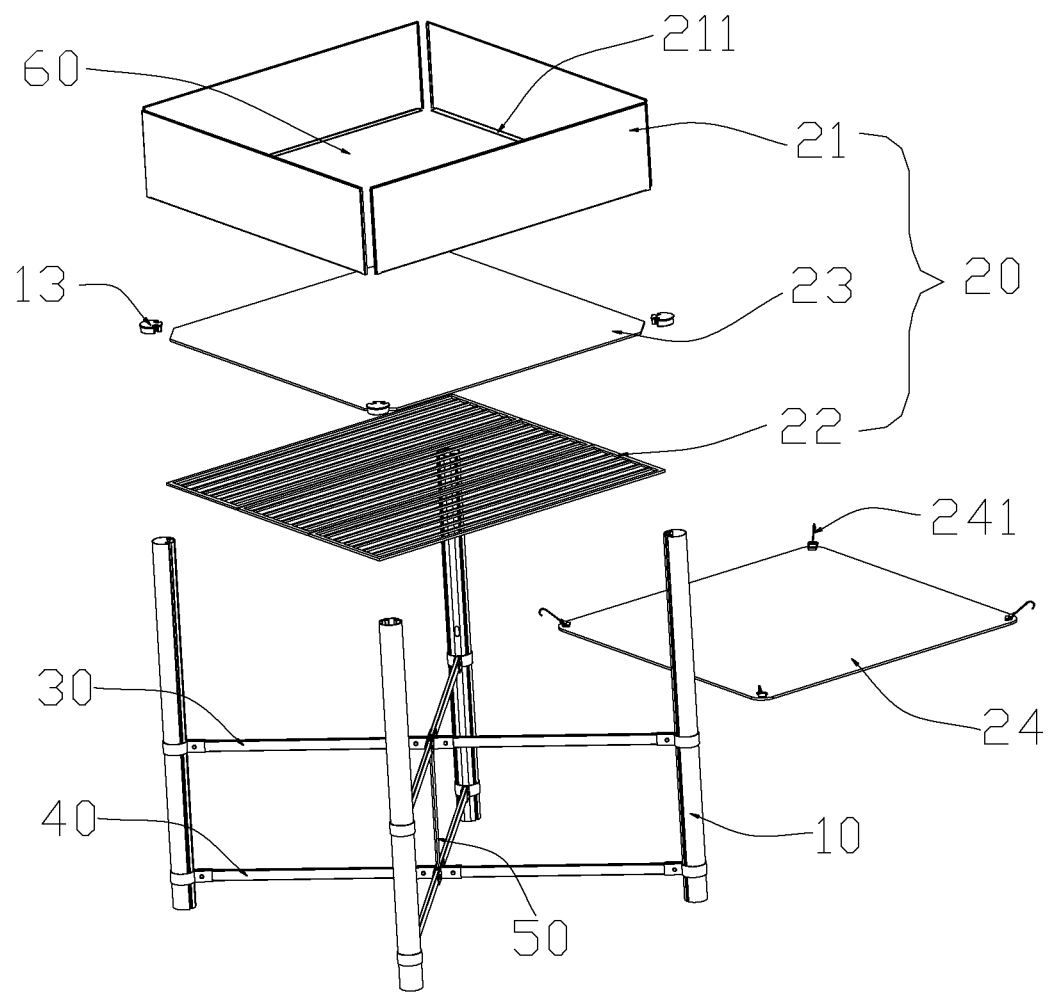
FIG. 6 is an exploded view of the outdoor campfire barbecue device of FIG. 5.

In at least one embodiment, referring to FIGS. 4 and 6, the campfire assembly 20 further includes a first supporting net 22. A lower part of the surrounding rods 21 is provided with supporting elements 211 extending from the surrounding rods 21 towards the accommodating space 60. The first supporting net 22 is connected to the supporting elements 211. Through such arrangements, the first supporting net 22 is connected to the supporting element 211 to form a supporting plane configured to support fuel such as charcoal thereon. In addition, the first supporting net is suspended at a bottom of the surrounding boards, which facilitate air flowing to ensure combustion effect of fuel such as charcoal. It can not only help users ignite the fuel such as charcoal, but also facilitate fully burning of the fuel such as charcoal, Therefore, it can prevent fuel from being waste, improve resource utilization, and effectively meet campfire demand of users.

In at least one embodiment, the campfire assembly 20 further includes a second supporting net 23 arranged in the accommodating space 60. The second supporting net 23 is detachably supported on the first supporting net 22. Through such arrangement, the second supporting net 23 is arranged on the first supporting net 22 to provide further support for the fuel such as charcoal. Both the first supporting net 22 and the second supporting net 23 have a plurality of apertures arranged at interval. In addition, a size of the aperture of the second supporting net 23 is less than that of the first supporting net 22, so that the second supporting net 23 can support fuels with smaller sizes. Therefore, it can improve adaptability of the support bracket and improve user's experience. Users can select whether to mount the second supporting net 23 or not according to sizes of fuel. Therefore, users can select many kinds of fuels for campfire, which further improve user's experience.

Figure 3:
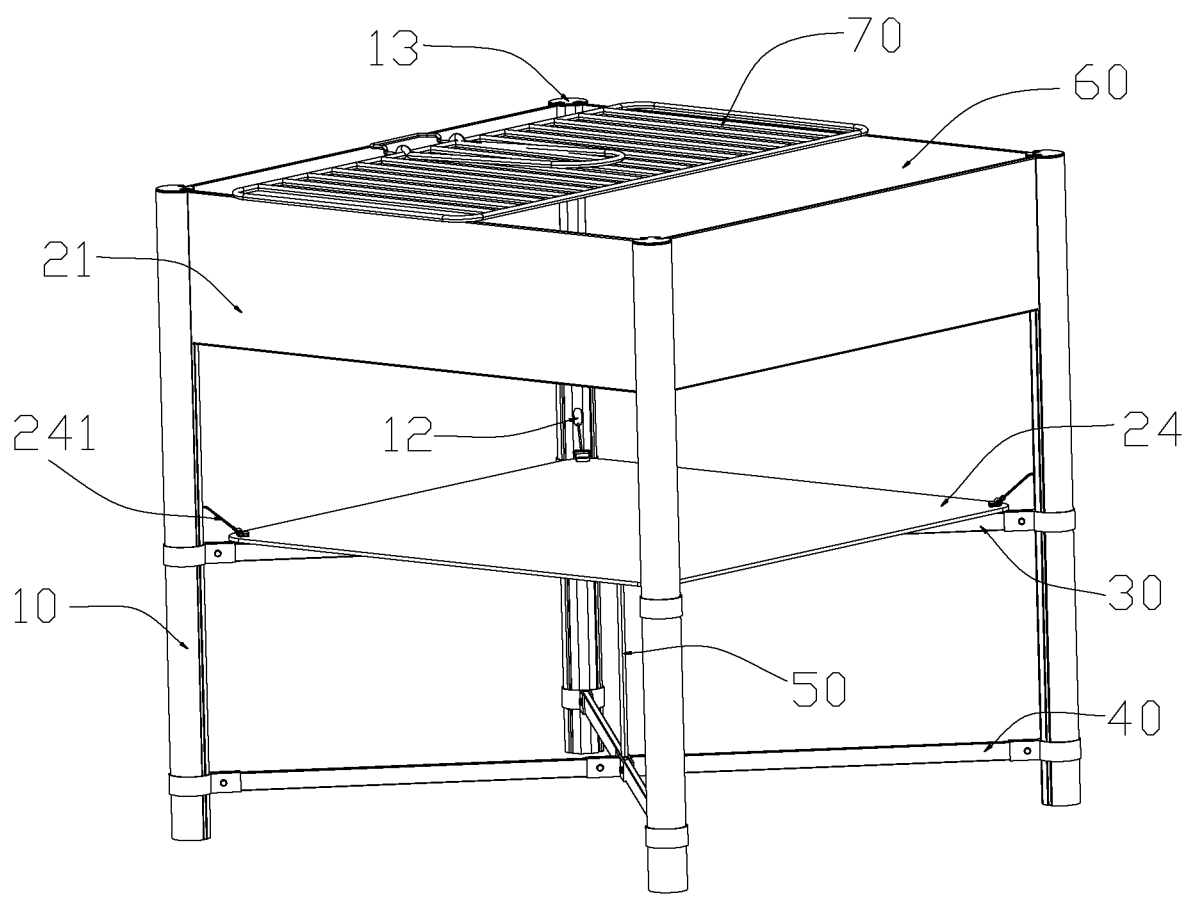
FIG. 3 is a schematic view of an outdoor campfire barbecue device in a campfire state according to an embodiment of the present disclosure.
Figure 5:
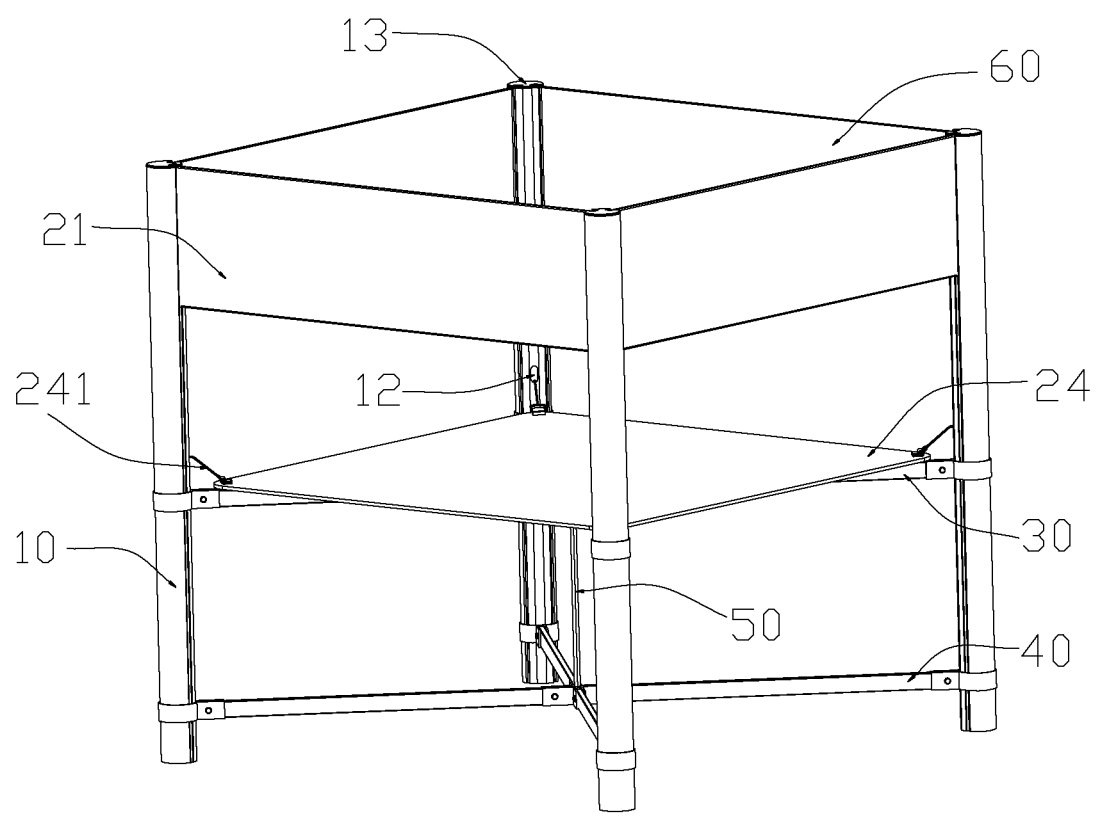
FIG. 5 is a schematic view of an outdoor campfire barbecue device in a barbecue state according to an embodiment of the present disclosure.

In at least one embodiment, referring to FIGS. 3 and 5, the campfire assembly 20 further includes a dust net 24. The dust net 24 is provided with hooks 241 at corners. The supporting rods 10 defines mounting holes 12 corresponding to the hooks 241. Each hook 241 can be engaged in corresponding mounting hole 12 so as to mount the dust net 24 on the supporting rods 10. Through such arrangement, the dust net 24 is arranged at a lower part of the accommodating space 60, which can effectively collect debris such as falling charcoal, burning embers, and oil stains from barbecues, thus preventing the support bracket from being stained. It can effectively keep the support bracket clean, which further improve user's experience. Moreover, it can prevent debris from falling on the ground, which make it easier for user to clean the ground. It can further prevent charcoal fire from falling on the ground to igniting combustibles on the ground, thus reducing risks and ensuring user's safety.

In at least one embodiment, the outdoor campfire barbecue device further includes end caps 13. Each supporting rod 10 defines an opening 14 at a top thereof. Each end cap 13 is configured to be mounted at the opening 14. Through such arrangement, the end caps 13 can effectively improve stability of the supporting rods 10 to improve stability of the support bracket, and make the support bracket more beautiful.

In at least one embodiment, the outdoor campfire barbecue device further includes a barbecue piece 70. Two opposite ends of the barbecue piece 70 can be supported on the surrounding boards 21. When in use, the barbecue piece 70 is placed on the surrounding boards 21 to support foods to be cooked thereon. The barbecue piece 70 can be any one of barbecue nets, barbecue disks, grills or skewers. The barbecue piece 70 is supported on the surrounding boards 21, which allow users to enjoy warmth or atmosphere, and to barbecue or to cook foods. It effectively meets demands of campfire and barbecue.

In at least one embodiment, the first supporting net 22, the second supporting net 23 and the dust net 24 are made of fire-proof materials. Through such amendment, the fire-proof materials not only can support fuel or debris, but also can prolong service life of the outdoor campfire barbecue device. Users can use the outdoor campfire barbecue device for campfire and barbecue for many times.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. An outdoor campfire barbecue device, comprising:
   a campfire assembly, configured to support fuel, wherein the campfire assembly comprises surrounding boards;
   at least three supporting rods, wherein for each of the at least three supporting rods, one end of it is configured to be supported on a supporting surface, the other end of it is configured to support the campfire assembly, each of the at least three supporting rods defines two slots, two opposite ends of each surrounding board are engaged in one of the two slots of two adjacent supporting rods to form an accommodating space;
   a middle rod, wherein one end of the middle rod is provided with a first pivot, and the other end of the middle rod is provided with a second pivot, the middle rod is configured to be capable of moving in an axial direction between an unfold state where the at least three first connecting rods are in a same plane perpendicular to the axial direction and a fold state where the supporting rods are close to the middle rod;
   at least three first connecting rods, wherein for each of the at least three first connecting rods, one end of it is pivotably connected to corresponding one of the at least three supporting rods, the other end of it is pivotably connected to the first pivot; and
   at least three second connecting rods, wherein for each of the at least three second connecting rods, one end of it is pivotably connected to corresponding one of the at least three supporting rods, the other end of it is pivotably connected to the second pivot;
   wherein the campfire assembly further comprises a first supporting net configured to support the fuel arranged in the accommodating space, a second supporting net arranged in the accommodating space and arranged on the first supporting net, sizes of apertures of the second supporting net are less than those of the first supporting net.

2. The outdoor campfire barbecue device according to claim 1, wherein each of the first connecting rods is pivotably connected to a middle part of the corresponding one of the supporting rods, and each of the second connecting rods is pivotably connected to a lower part of the corresponding one of the supporting rods.

3. The outdoor campfire barbecue device according to claim 1, wherein a lower part of the surrounding boards is provided with a supporting element extending towards the accommodating space, the first supporting net is connected to the supporting element.

4. The outdoor campfire barbecue device according to claim 1, wherein the second supporting net is detachably supported on the first supporting net.

5. The outdoor campfire barbecue device according to claim 1, wherein the first supporting net and the second supporting net are made of fire-proof materials.

6. The outdoor campfire barbecue device according to claim 1, further comprising a dust net configured to collect debris including falling fuel or fuel fire or barbecue stains.

7. The outdoor campfire barbecue device according to claim 6, wherein the dust net is provided with hooks at corners, a middle part of each supporting rod is provided with a mounting hole, each hook is configured to be engaged in the mounting hole.

8. The outdoor campfire barbecue device according to claim 6, wherein the dust net is made of fire-waterproof materials.

9. The outdoor campfire barbecue device according to claim 1, further comprising end caps, each supporting rod defines an opening at a top thereof, each end cap is configured to be engaged in the mounting hole.

10. The outdoor campfire barbecue device according to claim 1, further comprising a barbecue piece configured to support foods, two ends of the barbecue piece are capable of being supported on the surrounding boards.

* * * * *